United States Patent [19]
Sturrus

[11] Patent Number: 5,813,594
[45] Date of Patent: *Sep. 29, 1998

[54] APPARATUS FOR FORMING AN END BUMPER FOR VEHICLES

[75] Inventor: Peter Sturrus, Grand Haven, Mich.

[73] Assignee: Shape Corporation, Grand Haven, Mich.

[ * ] Notice: The term of this patent shall not extend beyond the expiration date of Pat. Nos. 5,454,504 and 5,092,512.

[21] Appl. No.: 734,353

[22] Filed: Oct. 21, 1996

Related U.S. Application Data

[63] Continuation of Ser. No. 534,123, Sep. 26, 1995, Pat. No. 5,566,874, which is a continuation of Ser. No. 297,142, Aug. 29, 1994, Pat. No. 5,454,504, which is a division of Ser. No. 12,230, Feb. 2, 1993, which is a continuation of Ser. No. 499,100, Mar. 26, 1990, Pat. No. 5,306,058.

[51] Int. Cl.$^6$ .................................................. B23K 31/02
[52] U.S. Cl. ........................................ 228/146; 228/176
[58] Field of Search ..................................... 228/176, 146, 228/155

[56] References Cited

U.S. PATENT DOCUMENTS

| D. 134,943 | 2/1943 | Mitchell . |
|---|---|---|
| 1,371,112 | 9/1921 | Wasson . |
| 1,424,359 | 8/1922 | Isgrig . |

(List continued on next page.)

FOREIGN PATENT DOCUMENTS

| 445075 | 6/1927 | Germany . |
|---|---|---|
| 1237453 | 3/1961 | Germany . |
| 58218453 | 12/1983 | Japan . |
| 5992232A | 5/1984 | Japan . |
| 597455 | 3/1978 | U.S.S.R. . |
| 1215803 | 12/1970 | United Kingdom . |
| 1497438 | 1/1978 | United Kingdom . |

OTHER PUBLICATIONS

Exhibit A is a brochure entitled *Profile—Yoder Rollforming Systems*, copyright 1989, Yoder Manufacturing.
"Application of Empirical Relationship Developed for Ultra–High Strength Steels in Bumper Design," SAE Technical Papers Series, by Borchelt et al., Feb. 26–Mar. 2, 1990.

(List continued on next page.)

*Primary Examiner*—Kenneth J. Ramsey
*Attorney, Agent, or Firm*—Price, Heneveld, Cooper, DeWitt & Litton

[57] ABSTRACT

An apparatus for forming an end bumper for vehicles constructed from a single sheet of high-tensile strength steel roll-formed to provide two side-by-side tubular sections. Each section has a front wall, an outer side wall, a rear wall, and an inner side wall, the inner side walls being spaced one from the other and connected together by a web roll-formed integrally with the inner side walls. The front walls each have extended ends overlapping and abutting the web. The extreme ends of the front walls also form an abutting juncture which is welded together and also welded to the web. The bumper has a sweep formed by a sweep-forming mechanism having curvilinear an external guide mechanism and internal mandrels conforming to the outer configuration and inner configuration of the bumper so as to provide a passageway therebetween for receiving the bumper. The bumper is passed through the passageway while the roll-forming of the bumper takes place upstream of the mandrels. The inner mandrel is supported by an elongated member extending from the internal mandrel to a support member located where the bending of the terminal lateral ends of the sheet have not yet been completed. A cutting mechanism cuts the bumper at predetermined lengths after the sweeping of the bumper has been completed to continuously form in succession a series of bumpers during the roll-forming of the sheet.

29 Claims, 5 Drawing Sheets

U.S. PATENT DOCUMENTS

| | | |
|---|---|---|
| 1,611,156 | 12/1926 | Borresen . |
| 1,649,922 | 11/1927 | Paull . |
| 1,663,424 | 3/1928 | Taylor . |
| 1,741,506 | 12/1929 | Dieterich . |
| 1,829,638 | 10/1931 | Egler . |
| 1,956,604 | 5/1934 | Williams . |
| 1,966,453 | 7/1934 | Lyon . |
| 2,077,454 | 4/1937 | Almdale . |
| 2,730,135 | 1/1956 | Wallace . |
| 2,817,364 | 12/1957 | Crawford . |
| 2,880,013 | 3/1959 | Dean . |
| 3,072,770 | 1/1963 | Goodridge . |
| 3,209,432 | 10/1965 | Cape . |
| 3,212,941 | 10/1965 | O'Brien . |
| 3,698,224 | 10/1972 | Saytes . |
| 3,843,182 | 10/1974 | Walls et al. . |
| 3,879,073 | 4/1975 | Norlin . |
| 3,905,630 | 9/1975 | Cantrell . |
| 3,920,173 | 11/1975 | Salata . |
| 4,010,969 | 3/1977 | Cantrell et al. . |
| 4,069,638 | 1/1978 | Hasselqvist et al. . |
| 4,116,480 | 9/1978 | Crestetto . |
| 4,160,562 | 7/1979 | Crestetto . |
| 4,326,398 | 4/1982 | Bégu″ . |
| 4,328,986 | 5/1982 | Weller et al. . |
| 4,481,803 | 11/1984 | Dieser . |
| 4,530,226 | 7/1985 | Granzow et al. . |
| 4,563,028 | 1/1986 | Ogawa et al. . |
| 4,599,843 | 7/1986 | Ingvarsson . |
| 4,714,287 | 12/1987 | Merkle . |
| 4,744,233 | 5/1988 | Trudell . |
| 4,838,606 | 6/1989 | Furubayashi et al. . |
| 4,905,885 | 3/1990 | Hellman, Sr. . |
| 4,961,603 | 10/1990 | Carpenter . |
| 4,971,239 | 11/1990 | Tyler et al. . |
| 5,080,410 | 1/1992 | Stewart et al. ............................ 293/102 |
| 5,092,512 | 3/1992 | Sturrus et al. ............................ 228/146 |
| 5,104,026 | 4/1992 | Sturrus et al. . |
| 5,163,225 | 11/1992 | Goleby . |
| 5,290,078 | 3/1994 | Bayer et al. ............................ 293/120 |
| 5,395,036 | 3/1995 | Sturrus . |
| 5,454,504 | 10/1995 | Sturrus ...................................... 228/17 |
| 5,566,874 | 10/1996 | Sturrus . |

OTHER PUBLICATIONS

"Design of Ultra–High Strength Sheet Steel Beams," SAE Technical Paper Series,, by Borchelt et al., Feb. 26–Mar. 2, 1990.

Golze, R.R. et al., "Bumper Design, Materials, and Fabrication, Society of Automotive Engineers, Paper No. 730030, Jan. 8–12, 1973, pp. 1–8.

"Properties and Applications of Low Carbon Martensitic Steel Sheets," McFarland et al., Jan. 13–17, 1969, pp. 1–17, SAE Paper No. 690263.

"Ultra High Strength Steel for Today's Needs," MartiINsite®, pp. 1–10.

Product made by apparatus of patent 5,092,512 was offered for sale sometime before Feb. 1992.

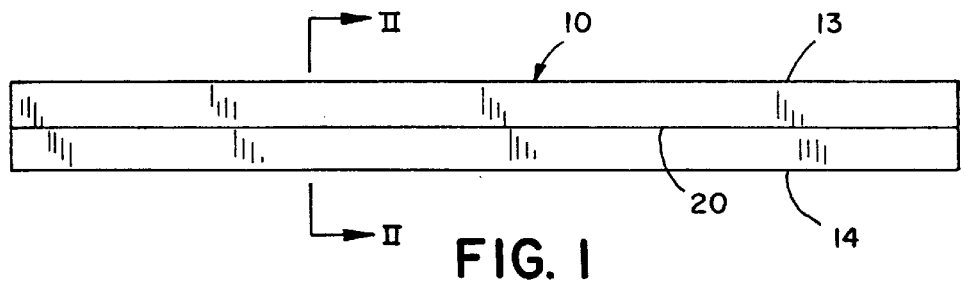
FIG. 1
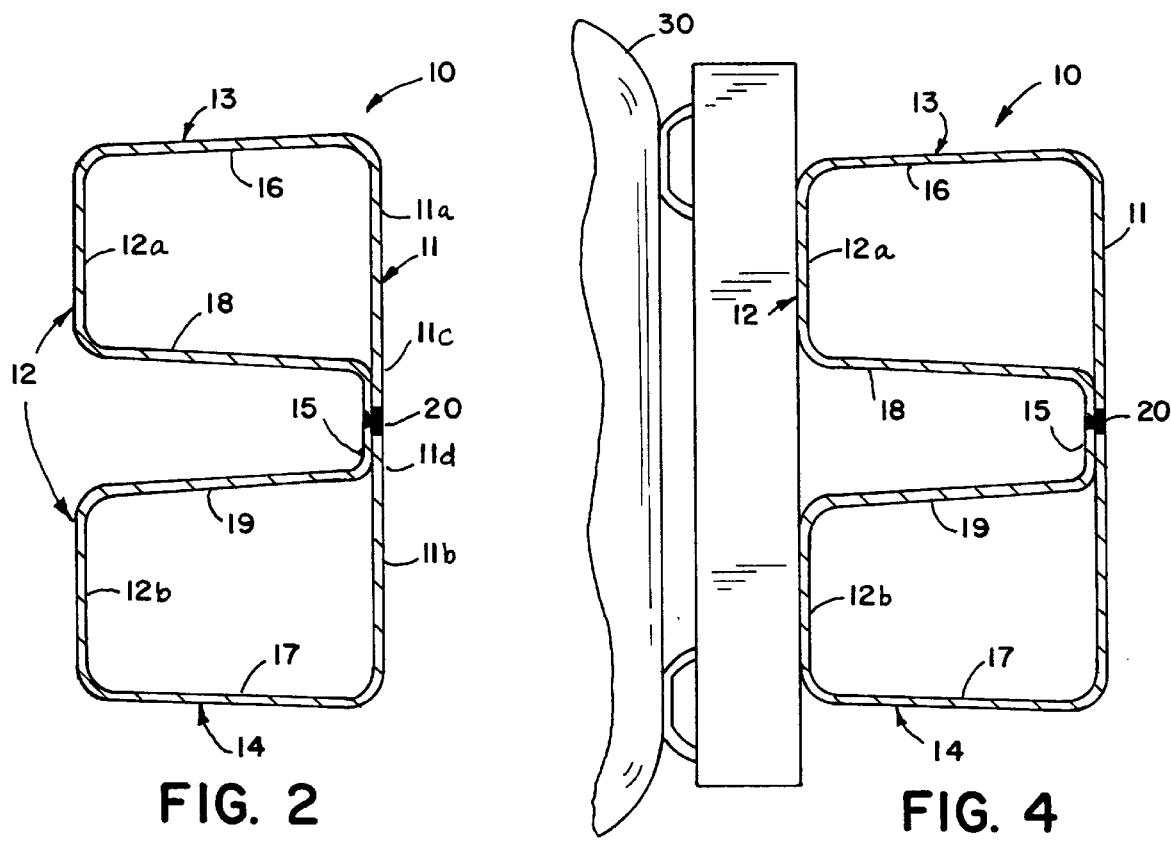
FIG. 2
FIG. 4
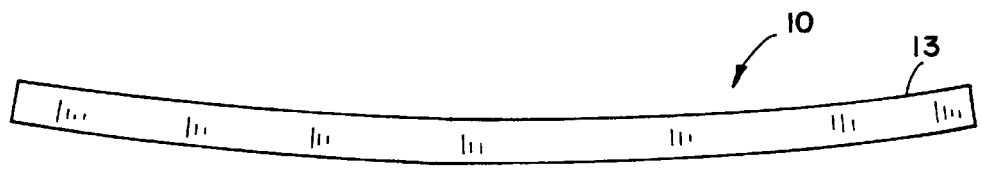
FIG. 3

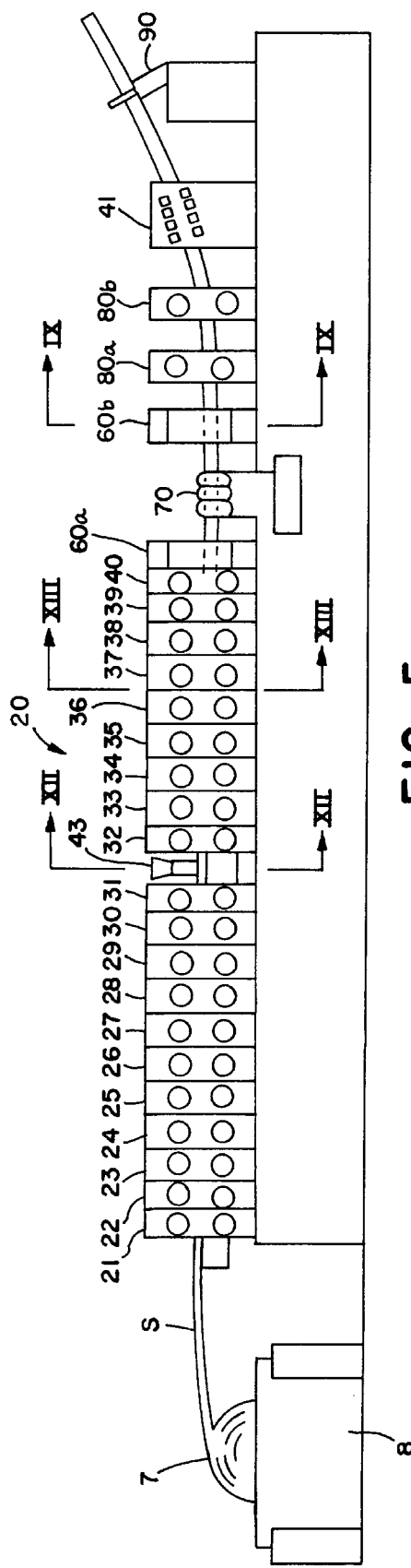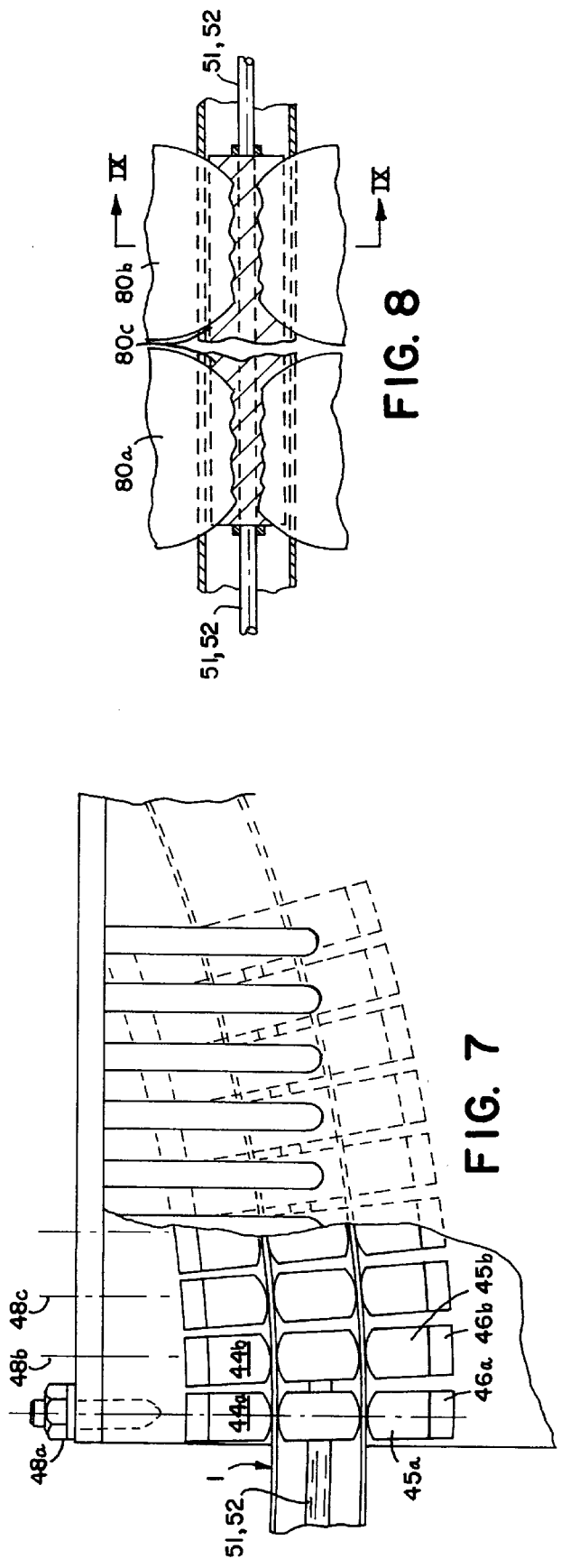

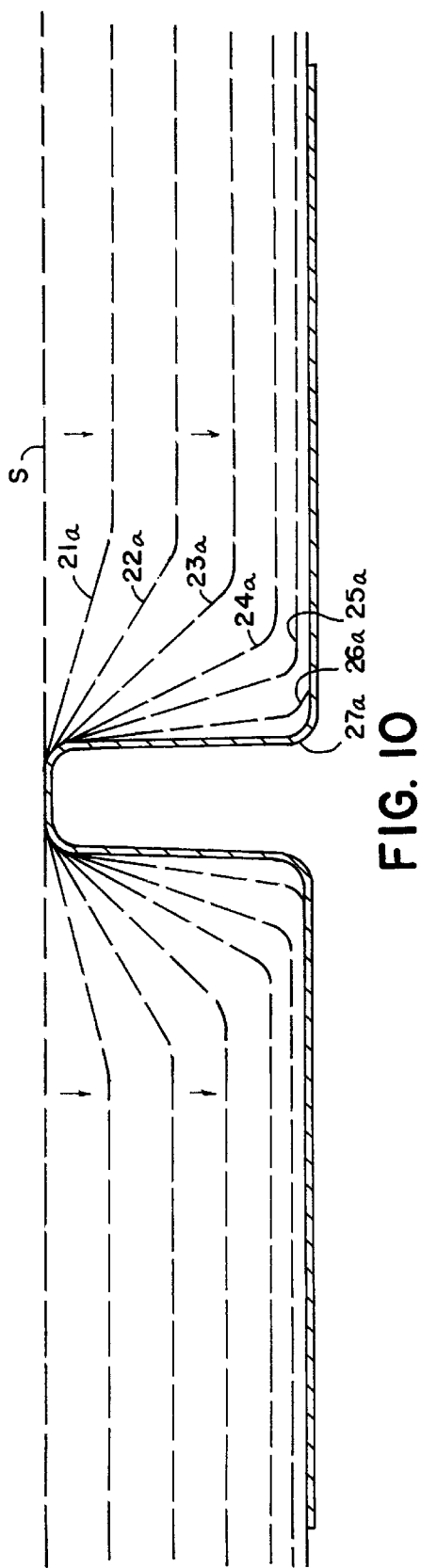
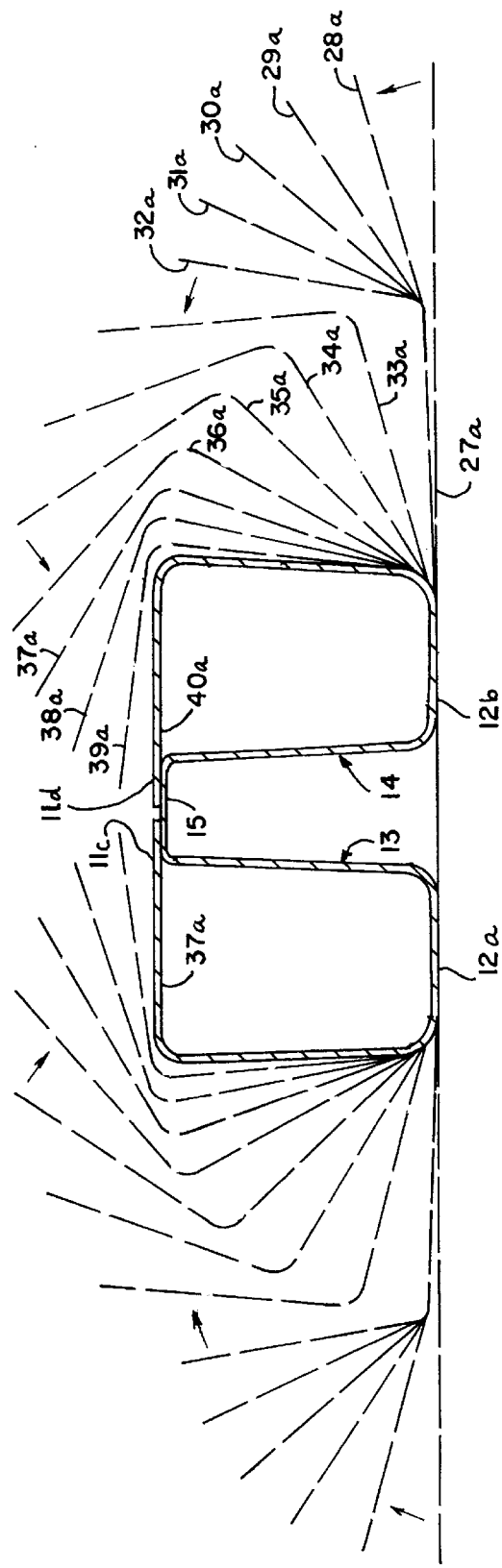
FIG. 10
FIG. 11

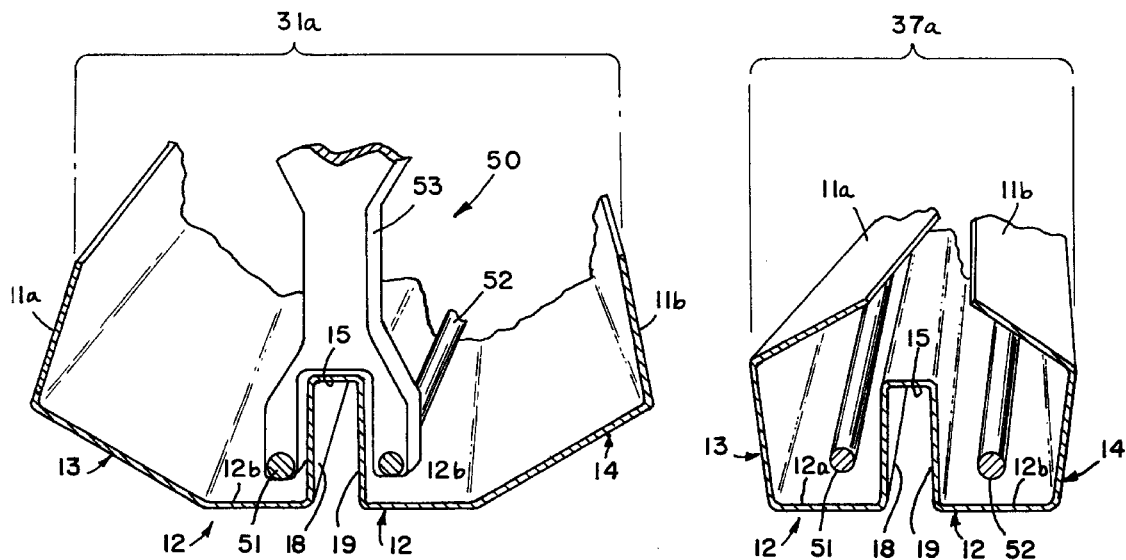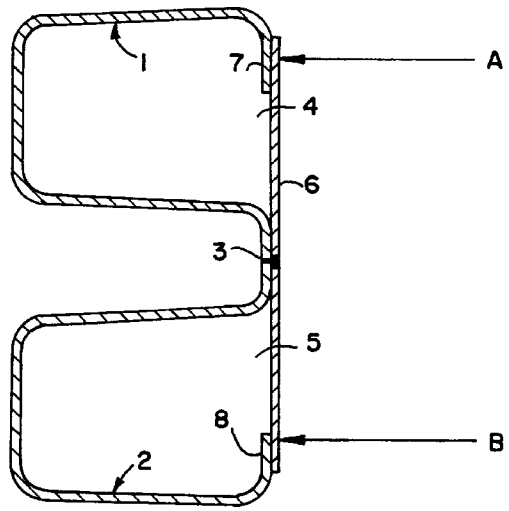

APPARATUS FOR FORMING AN END BUMPER FOR VEHICLES

AREA OF INVENTION

This invention relates to apparatus for forming automotive bumper bars for the ends of a vehicle and more specifically a roll-formed bumper made of high strength sheet steel having a high impact resistance, low weight, and relatively low cost of manufacture. This application is a continuation of application Ser. No. 08/534,123, filed Sep. 26, 1995, now U.S. Pat. No. 5,566,874 which is a continuation of U.S. patent application Ser. No. 08/297,142 filed Aug. 29, 1994, now U.S. Pat. No. 5,454,504, which is a division of U.S. patent application Ser. No. 08/012,230 filed Feb. 2, 1993 which is a continuation-in-part of Ser. No. 07/499,100 filed Mar. 26, 1990 (now U.S. Pat. No. 5,306,058).

BACKGROUND OF THE INVENTION

In my parent patent application Ser. No. 5,306,058 and my U.S. divisional Pat. Nos. 5,092,512 issued Mar. 3, 1992, and 5,104,026 issued Apr. 14, 1992, I disclose an automotive bumper and a method and apparatus of making such bumper of high strength steel and roll formed into a tubular cross-section. As set forth in such application and patents, the inventions of the above said application and patents solve the problems by roll-forming a closed tubular cross-section from high strength sheet steel of at least 60 KSI and 0.100 inches maximum thickness. The forming of a closed section greatly increases the strength of the bar and allowed weight reduction by use of a reduced material thickness. The closed design also improved deflection curves by avoiding the sudden collapse experienced by traditional "C" section bumpers as the flanges gave way.

Another important aspect of those inventions is the formation of a sweep during the roll-forming process. Such sweep allows for manufacture of a bumper which will satisfy modern aerodynamic designs and also increase the strength of the bumper and improve its spring-back characteristics.

Although the bumper of the above said application and patents is a great improvement over the prior art, I have conceived of an improvement thereof which has even greater strength. In addition to the strength, it has the advantage of less cost and less weight than other prior art bumpers of similar shape such as disclosed in FIG. 14 which will be described hereinafter.

Another prior art reinforcement bar utilized in a front bumper is disclosed in FIG. 14 which discloses a W-shaped or so-called double hat shaped bumper having openings 4 and 5 covered by steel plate member 6 welded to the outer legs 7 and 8 of sections 1 and 2 and to the web 3.

The W-shaped bumper of FIG. 14 is formed by roll-forming a single sheet of metal such as steel which is cut into predetermined lengths after which the metal plate 6 of the same predetermined length is attached to the C-shaped sections as disclosed in FIG. 14.

This prior art procedure is very costly because of the handling of the parts and the separate welding which requires several operations.

The reinforcement bar of FIG. 14 also has a decided disadvantage in that a striking force applied at the edges as illustrated by arrows A and B or between the edges and web 3 causes the welded ends to be forced apart destroying the integrity of the bar.

SUMMARY OF THE INVENTION

My present invention provides an automotive bumper bar which is formed of two tubular sections connected together and roll-formed from one piece of sheet steel. This tubular bumper is formed by roll-forming into two side-by-side tubular sections, each having a front wall, an outer side wall, a rear wall, and an inner side wall. The inner side walls are spaced one from the other and connected together by a web roll-formed integrally with the inner side walls. The front walls each have extensions thereof extending over, overlapping, and abutting the web where they are welded together and to the web.

My invention provides for the single sheet of high tensile strength steel to be formed in a continuous roll-forming operation, the tubular interconnected sections thus being formed in one operation as opposed to welding a separate steel piece over the open C-shaped sections as disclosed in FIG. 14.

In accordance with a narrower but important aspect of this invention, I construct my bumper from a Martensite steel which is thinner, stronger, and thus can be of substantially less weight. When Martensite is used, the weld is formed by a forged current penetration weld which provides a stronger weld.

It will become obvious from the above description that this invention provides a bumper not only of greater strength but one which is less costly and has less weight, all of which are extremely important because of the strength and the weight requirements in the automotive industry.

BRIEF DESCRIPTION OF THE DRAWINGS

FIG. 1 is a front view of the roll-formed bumper of this invention;

FIG. 2 is a cross-sectional view taken along the plane II—II of FIG. 1;

FIG. 3 is a plan view of the roll-formed bumper of the invention illustrating the sweep of the bumper;

FIG. 4 is a sketch illustrating the relationship of the bumper with respect to the body of the vehicle;

FIG. 5 is a schematic view of the roll-forming apparatus of this invention for practicing the process of this invention;

FIG. 7 is a cutaway, schematic view of the side of the sweeping means showing the sweeping mandrels and the anchoring rods;

FIG. 8 is schematic of a section of a roll-forming apparatus;

FIG. 10 is a schematic of the flow pattern of the steel sheet as the rollers progressively form the web portion of the bumper;

FIG. 11 discloses a continuing flow pattern of the steel sheet as the rollers form the sheet from the form disclosed in FIG. 10 to the completely formed sheet into the two tubular sections;

FIG. 12 is a perspective, cross-sectional view taken along the planes XII—XII of FIG. 5;

FIG. 13 is a perspective, cross-sectional view taken along the planes XII—XII of FIG. 5; and FIG. 14 is a cross-section of a prior art reinforcement for a bumper previously referred to above.

DESCRIPTION OF THE PREFERRED EMBODIMENT

Figure 6:
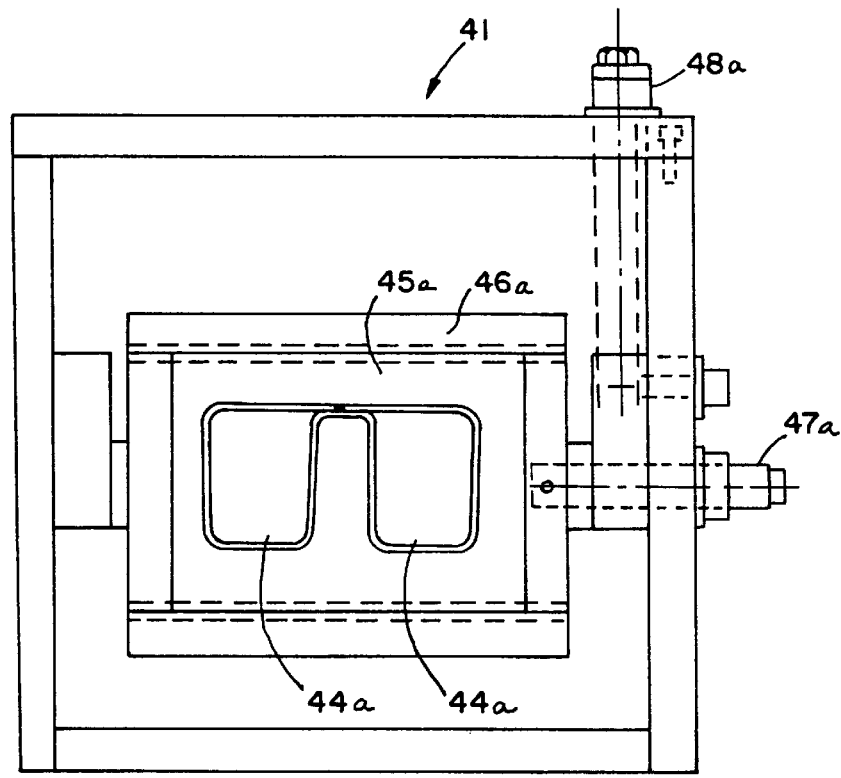
FIG. 6 is a frontal view of the sweeping station disclosing the mandrels which form the curvature in the bumper.

Referring to the drawings, FIGS. 1, 2, and 3 best disclose the bumper bar 10 of this invention having a front side 11 and a rear side 12. The bumper 10 is comprised of two tubular sections 13 and 14 connected together by the web 15. Each section has an outer side 16 and 17, respectively, and the inner sides 18 and 19, respectively. The back wall portion 12a connects the two side walls 16 and 18 of the section 13 and the back wall portion 12b connects the two side walls 17 and 19 of the tubular section 14. The wall portion 11a of the front wall 11 is connected to the side walls 16 and 18 and includes an extended end 11c that overlaps and abuts against the web 15. The wall portion 11b of the front wall 11 is connected between the side walls 17 and 19 and has an extended end 11d that also overlaps the web 15. The two extended ends 11c and 11d of the front wall abut each other and are welded to each other and to the web 15 by a forged current penetration weld 20.

As disclosed in FIG. 3, the bumper 10 has a #18 sweep. Sweep, as used in the automotive industry, is the term utilized to describe the curvature of the bumper. Measurements of sweep may be derived from charts such as disclosed in my application Ser. No. 07/499,100 filed Mar. 26, 1990, of which this application is a continuation-in-part and in my issued U.S. Pat. Nos. 5,092,512 and 5,104,026, which disclosures are incorporated by reference into this application.

Also incorporated by reference in this application, is the disclosure of different types of steel sheets suitable for the bumper as disclosed therein and the present bumper. In accordance with this invention, as in the disclosures of the above-referred to patent application and patents, it is important that the KSI range must be at least 60 KSI and can be as high as 200 KSI. In the preferred form of this invention, I prefer to use a Martensite that has a tensile strength of 190 KSI. Martensite is a low-carbon, alloy-free, cold rolled steel which is available in minimal tensile strengths ranging from 130 to 225 KSI. Due to the high Martensite start temperature, these low-carbon, alloy-free steels are auto-temperate, or self-temperate during the quench, and do not normally require tempering after quenching to avoid brittleness in high-carbon steels. Preferred results are obtained by thicknesses falling within the range of 0.035 to 0.072 inches.

FIG. 4 discloses for illustrative purposes only, a sketch showing a relationship of my bumper to a vehicle identified by the reference number 30. It will be noted that the bumper 10 is mounted on one end of the car, that is, the front or rear end with the front wall facing away from the vehicle. It is possible to reverse this position for some uses of the bumper.

FIGS. 5, 6, 7, 8, and 9 disclose the apparatus for forming the bumper bar 10 of this invention and thus illustrates the process in producing the bumper or bumper bar. Referring to FIG. 5, reference numeral 20 designates the overhaul apparatus which starting from the left side of the figure, discloses a steel roll holder 8 rotatably supporting the steel roll 9 which contains a flat steel strip "S" as disclosed above and which extends into the series of roller assemblies 21, 22, 23, 24, 25, 26, 27, 28, 29, 30, 31, 32, 33, 34, 35, 36, 37, 38, 39 and 40 which have shapes that as the strip is passed therethrough, the steel is gradually and progressively formed into the form as disclosed in FIG. 2. An illustration of the progression of the forming of the steel strip is illustrated in FIGS. 10 and 11 wherein the steel strip forms 21a, 22a, 23a, 24a, 25a, 26a, etc. are respectively produced by the rollers 21, 22, 23, 24, 25, 26, etc. After passing through rollers 21-40, the formed strip S is passed through the holding rollers 60a and 60b between which is mounted the welding apparatus 70. The hold down fixtures 60a and 60b are provided, particularly when the steel strip is a 190 KSI Martensite which tends to spring back to its original form. The fixtures 60a and 60b hold the last formed edges 40a as viewed in FIG. 11 down against the web 15 and in abutting relationship with the web and with each other while the welding apparatus 70 welds the extended portions 11c and 11d to each other and to the web 15. The welding apparatus 70 is of the type which produces a forged current penetration weld, particularly when the strip is a Martensite steel. It has been found that when the strip S is a Martensite steel, the forged current penetration weld is more reliable than other welds.

Although I have disclosed 20 roller assemblies to produce the shaped bar of my invention, the number can be substantially increased and under some circumstances, the number can be decreased. As disclosed in my co-pending application Ser. No. 07/499,100, a unique sweep means is provided downstream of the welder 70 and hold down fixture 60b. This sweep producing or sweeping means disclosed in FIGS. 5, 6, 7, 8, 9, 12, and 13 comprises a sweeping box 41 which includes a series of pairs of internal and external mandrels (44a and 45a, 44b and 45b, etc.) between which the tube formed by the rollers 23–37 and welded by welder 40 pass. These mandrels have rounded ends as disclosed to assist in guiding the dual tube 10 between them. Each external mandrel is held by a mandrel frame such as 46a (FIGS. 6 and 7) which is anchored at a horizontal center point by stabilizer 47a. The sweep of the bumper may be increased by vertical adjustment of the sweep adjustors 48a, 48b, 48c, etc. For example, as sweep adjustor 48a is adjusted upward, stabilizer 47a is also raised, thus forcing frame 46a and external mandrel 45a upwardly. Obviously, internal mandrel 44a is forced to follow this movement since a cross-sectional shape of the internal mandrels 44a, 44b, etc. are substantially identical to the cross-section of the bumper 10. Therefore, as a roller formed tube or bumper passes therethrough, it assumes a curvature or sweep determined by the position of mandrels.

The internal mandrels are supported by support assembly 50 (FIG. 12) which includes two rods 51 and 52 extending from and secured to the support 53. The location of the support 53 is selected to a position where the support 53 and extend downwardly into the tube as illustrated by FIG. 12. In this position, the steel strip has been rolled to form 31a (FIG. 11). The center section formed by the web 15 and inner sides 18 and 19 has been formed along with the back portions 12a and 12b. This leaves an opening through the top of the bumper being formed for receiving the fork-shaped support 53 to which rods 51 and 52 are secured.

Figure 9:
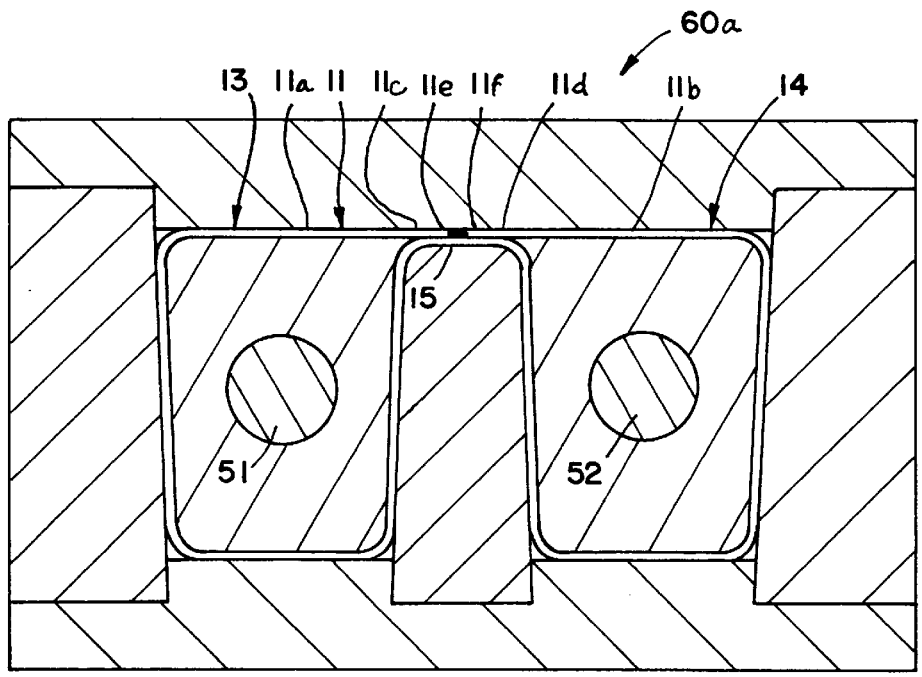
FIG. 9 is a cross-sectional view taken along the plane IX—IX of FIG. 4.

As previously disclosed, downstream of the support 53, the steel strip continues to pass through the rollers until such time that it reaches the form as disclosed in FIG. 9 which discloses the dual tube bumper formed to the desired shape with the edges of the extended portions 11c and lid abutting and such extensions overlapping and abutting the connecting web 15 which connects the two tubular sections 13 and 14. FIG. 9 discloses the holding fixture 60a. Identical holding fixtures 60a and 60b, are located on each side of the welder 70 for the purpose of holding the formed strip or bumper when being welded in the position as shown in FIG. 9. As previously described, this is necessary in order to account for the tendency of the two portions 11a and 11b of the front 11 of the bumper from springing apart while the welding operation is taking place.

After being welded, the tube then continues through pushing rollers 80*a* and 80*b* which are configurated the same as the configuration of the bumper 10 so as to push against the internal mandrels 80*c* which are similar in shape to the inside cross-section of the tubular sections of the bumper such as disclosed in FIG. 9. This allows rollers 80*a* and 80*b* to generate sufficient force to force bumper bar 1 into the sweeping box 41 without crushing or deforming the cross-section of the bumper 10.

The cross-sectional shape of the bumper 10 provides a means for moving the bumper over the mandrels 44*a*, 44*b*, etc. and between such mandrels and the outer mandrels 45*a*, 45*b*, etc. Thus, as the bumper is pushed through the sweeping box 41, it is given a sweep depending upon the adjustment of the positions of the mandrels 44*a*, 44*b*, 45*a*, and 45*b* etc.

OPERATION

Having described the apparatus for forming the bumper, it should be realized that the steel strip S is paid off from roll 7 and passed through the roll assemblies to form the dual tube bumper 1 as disclosed in FIG. 9 with the edges of the front wall extensions 11*c* and 11*d* abutting each other and such extensions overlaying and abutting the web 15. In this position, the welder 70 forms the welded seam 30 to form a unitary, integral tube 10 as disclosed in FIG. 6, the tube thus formed being straight.

As in my co-pending application Ser. No. 07/499,100, it is within the contemplation of the broader aspects of this invention that the bumper thus formed can be utilized as a straight bumper having substantially improved characteristics. It has a substantially higher level of strength and damage resistance so as to meet consumer expectation and government regulation concerning low speed vehicular impact. It also has low weight to minimize vehicular dead weight and low manufacturing costs. The high strength-to-weight ratio and ease of manufacture contribute to the superiority of the present bumper. Such superiority is made possible by forming a bumper of a high strength sheet steel, with lower than normal thickness, roll-formed as disclosed above from a single strip of steel.

In accordance with the preferred more narrow aspects of this invention, the bumper formed by the roller assemblies and welder is curved or swept to produce a bumper having a sweep of from #0–60. Such curvature or sweep is produced by passing the bumper from the induction welder over the curved mandrel pairs 44*a*, 44*b*, etc. and 45*a*, 45*b*, etc., it being understood that one or more mandrels can be used. After the sweep is formed, the bumper bar 10 is cut off by the cut-off apparatus 90 (FIG. 5).

Although I have disclosed a preferred embodiment of this invention, it should be understood that many variations can be made without departing from the spirit and scope of this invention.

The embodiments of the invention on which an exclusive property or privilege is claimed are defined as follows:

1. A method of forming bumper bars for vehicles comprising steps of:

providing an elongated sheet of high strength steel having a tensil strength of at least about 60 KSI;

continuously roll-forming the sheet of high strength steel with a roll-forming apparatus into an elongated linear shape with portions of the sheet engaging one another to form at least one closed tubular section, the elongated linear shape having a cross section shaped for beam strength, for impact resistance, and for vehicle aesthetics;

providing a welder located generally in-line with an end of the roll-forming apparatus;

by using the welder, welding the portions of the sheet together to permanently form the at least one closed tubular section as the elongated linear shape exits the roll-forming apparatus;

providing a sweeping mechanism including internal and external mandrels constructed to deform the elongated linear shape, and supporting the internal mandrel from a location upstream of the sweeping mechanism;

providing a driving mechanism proximate the sweeping mechanism having sufficient power to force the elongated linear shape including the at least one closed tubular section through the sweeping mechanism, the driving mechanism being located relatively close to the sweeping mechanism to minimize a distance therebetween;

by using the sweeping mechanism and the driving mechanism, continuously sweeping the elongated linear shape into an elongated curvilinear shape simultaneously with the step of continuously roll-forming the sheet;

maintaining the cross section during the step of sweeping by supporting the cross-section of the elongated linear shape at and also upstream of the sweeping mechanism, the supporting at the sweeping mechanism being provided by a downstream portion of the internal mandrel and by the external mandrel, and the supporting upstream of the sweeping mechanism being provided by an upstream portion of the internal mandrel and by an exterior holder located between the welder and the external mandrel, the upstream portion of the internal mandrel being located upstream from the downstream portion of the internal mandrel and extending sufficiently close to the driving mechanism to prevent undesired crushing and deformation of the cross section including the at least one closed tubular section; and cutting segments from the elongated curvilinear shape to make bumper bars for vehicles.

2. The method defined in claim 1 wherein the at least one closed tubular section includes two closed tubular sections formed by abutting edges of the elongated sheet onto an intermediate section of the sheet forming a web, and the step of roll-forming includes forming said two closed tubular sections, and further the step of welding includes welding the edges to each other as well as to the web.

3. The method defined in claim 2 wherein the two closed tubular sections are spaced apart, and wherein the roll-forming includes rollers for forming the two closed tubular sections.

4. The method defined in claim 1 wherein the exterior holder includes rollers positioned downstream of the welder.

5. The method defined in claim 4 wherein the rollers of the exterior holder also form a part of the driving mechanism, said rollers being positioned downstream of the welder and being located proximate the upstream portion of the internal mandrel.

6. The method defined in claim 5 wherein the downstream portion of the internal mandrel includes a plurality of first segments substantially filling a cross-sectional space inside of the at least one closed tubular section.

7. The method defined in claim 6 wherein the upstream portion of the internal mandrel includes a plurality of first segments substantially filling the cross-sectional space inside of the at least one closed tubular section.

8. The method defined in claim 1 wherein the sweeping mechanism is located relatively close to the welder so that the sheet is still at an elevated temperature from the welding so that the elevated temperature of the sheet assists in forming the sheet.

9. The method defined in claim 8 wherein the sweeping mechanism is positioned as close as possible to a location in the welder at which the welding takes place.

10. The method defined in claim 1 wherein the at least one closed tubular section includes a first tubular section with relatively flat opposing side walls defining substantially parallel planes, and wherein the step of maintaining the cross-section during the step of sweeping includes supporting the opposing side walls on inside and outside surfaces to keep the opposing side walls substantially flat and in the parallel planes as the elongated linear shape is forced into and through the sweeping mechanisms, respectively, whereby the bumper bars made from the cut segments have excellent impact strength when impacted in a direction parallel the planes.

11. The method defined in claim 10 wherein the at least one closed tubular section includes a second tubular section with relatively flat opposing side walls that are also substantially parallel the planes, and wherein the step of maintaining includes supporting the opposing side walls of the second tubular section to keep the opposing side walls flat and parallel the planes, and wherein the step of welding includes welding edges of the sheet to each other, as well as to an intermediate web section.

12. The method defined in claim 1 including providing an anchor in the roll-forming apparatus at a location where the portions of the sheet are not yet engaged, providing at least one elongated rod extending downstream through the at least one tubular section, and including a step of holding the internal mandrel at a fixed location during the step of continuously roll-forming by use of the at least one elongated rod.

13. The method defined in claim 1 wherein the sweeping mechanism sweeps the elongated curvilinear shape upwardly from a first height at which the roll-forming takes place; and including providing a cutter constructed to cut the elongated curvilinear shape at a location elevated above the first height, and wherein the step of cutting includes operating the cutter at the elevated location.

14. The method defined in claim 1 wherein the elongated sheet has a tensile strength of at least 120 ksi.

15. The method defined in claim 14 wherein the elongated sheet has a tensile strength of at least about 200 ksi.

16. The method defined in claim 15 wherein the elongated sheet has a thickness in the range of about 0.035 to 0.072 inches.

17. The method defined in claim 14 wherein the elongated sheet comprises martensite and has a hardness range of about 130 to 225 ksi.

18. The method defined in claim 17 wherein the elongated sheet has a thickness of less than about 0.100 inches.

19. The method defined in claim 14 wherein the elongated sheet has a thickness of about 0.035 to 0.072 inches.

20. The method defined in claim 1 wherein the step of providing a welder includes locating the welder as close as possible to an end of the roll-forming apparatus.

21. A method of forming bumper bars for vehicles comprising steps of:
providing an elongated sheet of high strength steel;
continuously roll-forming the sheet of high strength steel with a roll-forming apparatus into an elongated shape with edge portions of the sheet abutting an intermediate section on the sheet to form at least two closed tubular sections, the elongated shape having a cross section shaped for beam strength, for impact resistance, and for vehicle aesthetics;
providing a welder located generally in-line with an end of the roll-forming apparatus;
welding the edge portions of the sheet together to each other, as well as to the intermediate section, to permanently form the elongated shape as the elongated shape exits the roll-forming apparatus;
providing a sweeping mechanism constructed to deform the elongated shape and a driving mechanism proximate the sweeping mechanism having sufficient power to force the elongated shape past the sweeping mechanism;
continuously sweeping the elongated shape into an elongated curvilinear shape simultaneously with the step of continuously roll-forming the sheet; and
cutting segments from the elongated shape to make bumper bars for vehicles.

22. The method defined in claim 21 including supporting the cross section of the elongated shape by an internal mandrel located upstream of the sweeping mechanism, but located close to the sweeping mechanism to prevent undesired crushing and deformation of the cross section of the tubular sections during the step of continuously sweeping.

23. An apparatus for forming a bumper bar for a vehicle comprising:
first rollers for continuously roll-forming a sheet of high tensile strength steel into an elongated structural member with portions of the sheet engaging one another to form at least one tubular section, the structural member having a cross-sectional shape;
a welder positioned in line with the first rollers for welding the portions of the sheet together to permanently form the at least one tubular section;
a sweep mechanism characteristically positioned downstream and relatively close to the welder so that a sweep can be imparted into the high tensile strength steel relatively soon after roll-forming and welding the sheet, the sweep mechanism including first internal mandrels engaging inner surfaces of the at least one tubular section and further including external mandrels engaging outer surfaces of the structural member, the internal and external mandrels closely engaging the structural member and being configured to impart a curvilinear sweep to the elongated member while at the same time maintaining the cross-sectional shape of the structural member;
a holder positioned upstream of the sweep mechanism, the holder including second internal mandrels and second rollers for engaging the inner and outer surfaces, respectively, of the at least one tubular section, the second internal mandrels and the second rollers being configured to maintain the cross-sectional shape of the structural member and to prevent the cross-sectional shape from crushing and unacceptably deforming as the high tensile strength steel is forced through the sweep mechanism;
a drive mechanism having sufficient power to force the high tensile strength, roll-formed elongated structural member through the sweep mechanism;
a support member located upstream of the sweep mechanism where the at least one tubular section has not been completely closed, thereby providing an opening through which the support member extends;
an elongated member extending from the support member through the at least one tubular section for anchoring the first and second internal mandrels; and a device for cutting off sections of predetermined length from the elongated curvilinear shape.

24. The apparatus defined in claim 23 wherein the at least one tubular section includes first and second tubular sections formed by edges of the sheet abutting an intermediate section forming a web, and wherein the first rollers are constructed to form the first and second tubular sections by deforming the end sections into contact with the intermediate section, and further wherein the welder is constructed to weld the edges of the sheet to each other, as well as to the intermediate section.

25. The apparatus defined in claim 24 wherein the first and second tubular sections are spaced apart and connected by a web, and wherein the first rollers are constructed to from the first and second tubular sections.

26. The apparatus defined in claim 23 wherein the first internal mandrel includes a plurality of mandrel segments, and wherein said segments include angled surfaces for assisting in guiding the at least one tubular section onto and over the mandrel segments.

27. The apparatus defined in claim 23 wherein the first and second internal mandrels are positioned proximate each other.

28. The apparatus defined in claim 23 wherein the sheet comprises ultra high strength steel having a tensile strength of at least about 120 ksi and a thickness of about 0.035 to 0.072 inches, and wherein the driving mechanism is constructed to generate enough force to advance the sheet of ultra high strength steel across the rollers and through the sweep mechanism.

29. The apparatus defined in claim 28 wherein the welder is located in-line with and proximate an end of a portion of the apparatus that includes the first rollers.

* * * * *